United States Patent
Hughes (10) Patent No.: US 12,212,230 B2
(45) Date of Patent: Jan. 28, 2025

(54) DEVICES, SYSTEMS, AND METHODS FOR REDUCING LEAKAGE CURRENT IN POWER CONVERTERS

(71) Applicant: TRANE INTERNATIONAL INC., Davidson, NC (US)

(72) Inventor: John Hughes, Flint, TX (US)

(73) Assignee: TRANE INTERNATIONAL INC., Davidson, NC (US)

( * ) Notice: Subject to any disclaimer, the term of this patent is extended or adjusted under 35 U.S.C. 154(b) by 171 days.

(21) Appl. No.: 17/990,890

(22) Filed: Nov. 21, 2022

(65) Prior Publication Data

US 2024/0171065 A1  May 23, 2024

(51) Int. Cl.
| | |
|---|---|
| *H02M 7/04* | (2006.01) |
| *F24F 11/88* | (2018.01) |
| *H02M 1/12* | (2006.01) |
| *H02M 1/36* | (2007.01) |
| *H02M 1/42* | (2007.01) |
| *H02M 3/158* | (2006.01) |
| *H02P 27/06* | (2006.01) |

(52) U.S. Cl.
CPC ............. *H02M 1/126* (2013.01); *F24F 11/88* (2018.01); *H02M 1/36* (2013.01); *H02M 1/42* (2013.01); *H02M 3/158* (2013.01); *H02M 7/04* (2013.01); *H02P 27/06* (2013.01)

(58) Field of Classification Search
CPC .......... H02M 1/36; H02M 1/42; H02M 3/158; H02M 7/04; H02M 1/123; H02P 27/06
See application file for complete search history.

(56) References Cited

U.S. PATENT DOCUMENTS

| | | | |
|---|---|---|---|
| 5,012,652 A | 5/1991 | Dudley | |
| 5,615,071 A | 3/1997 | Higashikata et al. | |
| 7,281,910 B2 | 10/2007 | Hasegawa | |
| 8,013,705 B2 | 9/2011 | Oh et al. | |
| 9,212,661 B2 | 12/2015 | Fukasaku et al. | |
| 9,353,738 B2 | 5/2016 | Ramayya | |
| 2004/0174652 A1* | 9/2004 | Lewis .................... | H02H 9/005 361/118 |
| 2009/0160573 A1* | 6/2009 | Salsich .................. | H03H 7/427 333/25 |
| 2011/0083450 A1 | 4/2011 | Turner et al. | |
| 2011/0141774 A1* | 6/2011 | Kane ..................... | H02M 5/4585 363/44 |
| 2011/0216451 A1* | 9/2011 | Haines .................. | H02H 3/338 361/93.6 |
| 2012/0000218 A1 | 1/2012 | Nystrom | |
| 2020/0052581 A1* | 2/2020 | Rosén ...................... | B25F 5/00 |

FOREIGN PATENT DOCUMENTS

| | | |
|---|---|---|
| EP | 0432085 B1 | 9/1995 |
| JP | 2004176682 A | 6/2004 |

\* cited by examiner

*Primary Examiner* — Bickey Dhakal
(74) *Attorney, Agent, or Firm* — Womble Bond Dickinson (US) LLP (57) ABSTRACT

Devices, systems, and methods are disclosed for reducing leakage current in power converters, such as for HVAC systems, to facilitate compatibility with GFCI devices. In various embodiments, the power converter may include components to filter and/or reduce common mode noise, such as by removing high frequency components of the common mode noise, while maintaining leakage current below a trip threshold of a GFCI device.

20 Claims, 9 Drawing Sheets

DEVICES, SYSTEMS, AND METHODS FOR REDUCING LEAKAGE CURRENT IN POWER CONVERTERS

TECHNOLOGICAL FIELD

The present disclosure relates generally to improved devices, systems, and methods for reducing leakage current in power converters, such as in power converters of heating, ventilation, and air conditioning (HVAC) systems. In particular, the reduction in leakage current in power converters may facilitate compatibility with electrical circuits having a ground fault circuit interrupter (GFCI).

BACKGROUND

Generally, HVAC systems are used to heat and/or cool building spaces. Such building spaces include single story and multi-story schools, office buildings, and manufacturing facilities, for example. A HVAC system may include a heat transfer circuit to provide cooled or heated air to an area. The heat transfer circuit is configured to heat and/or cool a process fluid (e.g., air, water and/or glycol, or the like) with a working fluid (e.g., one or more refrigerants) in a heat exchanger. The working fluid is circulated through the heat transfer circuit via a compressor that compresses the working fluid.

Various HVAC systems include, or are connected to, GFCI protection, such as via residential outdoor outlets. Combining existing GFCI devices with a typical HVAC system may result in unintended "nuisance" trips of the GFCI device, resulting in sub-optimal comfort performance. The present disclosure seeks to avoid or minimize such nuisance trips.

BRIEF SUMMARY

Devices, systems, and methods are disclosed for reducing leakage current in power converters, such as for HVAC systems, to facilitate compatibility with GFCI devices. In various embodiments, the power converter may include components to filter and/or reduce common mode noise, such as by removing high frequency components of the common mode noise, while maintaining leakage current below a trip threshold of a GFCI device. More generally, embodiments may include a power converter utilized for transforming power from a power source into drive power for an electrical load, such as a motor. The power converter may include a rectifier for converting an alternating current (AC) power into a direct current (DC) power of a first voltage, a DC-to-DC converter for converting the DC power of the first voltage to a DC power of a second voltage, a multi-pole common mode filter for removing a high frequency component from the DC power of the second voltage to produce a filtered DC power, and an inverter for producing drive power for an electrical load from the filtered DC power. Many embodiments include powering a driver for the DC-to-DC converter with an isolated power supply and/or using an isolator between a power factor correction (PFC) controller and the driver. Several embodiments include coupling the DC-to-DC converter and a driver for the DC-to-DC converter to an unfiltered DC− ground, coupling the internal components of the multi-pole common mode filter to an earth ground, and coupling the inverter to a filtered DC− ground.

The present disclosure thus includes, without limitation, the following example embodiments. Some example implementations provide an HVAC system including: a compressor; an electric motor coupled to the compressor; a rectifier for converting an AC input power into a DC power with a first voltage; a DC-to-DC converter for converting the DC power with the first voltage into a DC power with a second voltage, wherein the DC-to-DC converter includes a driver; a multi-pole common mode filter for removing a high frequency component from common mode noise in the DC power with the second voltage to produce a filtered DC power, wherein the multi-pole common mode filter comprises a portion of an electrical circuit including a GFCI and removal of the high-frequency component by the multi-pole common mode filter produces a leakage current below a trip threshold of the GFCI; and an inverter for converting the filtered DC power into a drive power for the electric motor coupled to the compressor Other example implementations provide a power converter for an HVAC system including: a rectifier for converting an AC input power into a DC power with a first voltage; a DC-to-DC converter for converting the DC power with the first voltage into a DC power with a second voltage; a multi-pole common mode filter for removing a high frequency component from common mode noise in the DC power with the second voltage to produce a filtered DC power, wherein the multi-pole common mode filter comprises a portion of an electrical circuit including a ground fault circuit interrupter (GFCI) and removal of the high-frequency component by the multi-pole common mode filter produces a leakage current below a trip threshold of the GFCI; and an inverter for converting the filtered DC power into a drive power for an electric motor coupled to a compressor.

Still other example implementations provide a method for an HVAC system including: converting, with a rectifier, an AC input power into a DC power with a first voltage; converting, with a DC-to-DC converter, the DC power with the first voltage into a DC power with a second voltage; removing, with a multi-pole common mode filter, a high frequency component from common mode noise in the DC power with the second voltage to produce a filtered DC power, wherein the multi-pole common mode filter comprises a portion of an electrical circuit including a GFCI and removal of the high-frequency component by the multi-pole common mode filter produces a leakage current below a trip threshold of the GFCI; and converting, with an inverter, the filtered DC power into a drive power for an electric motor coupled to a compressor.

Other example implementations provide a device for converting power comprising: a rectifier for converting an alternating current (AC) input power into a direct current (DC) power with a first voltage; a DC-to-DC converter for converting the DC power with the first voltage into a DC power with a second voltage, wherein the DC-to-DC converter includes a driver; a multi-pole common mode filter for removing a high-frequency component from the DC power with the second voltage to produce a filtered DC power; and an inverter for converting the filtered DC power into an AC drive power.

Still other implementations provide a method comprising: converting an alternating current (AC) input power to a direct current (DC) power of a first voltage; converting the DC power of the first voltage into a DC power of a second voltage; removing a high-frequency component from the DC power of the second voltage with a multi-pole common mode filter to produce a filtered DC power; and converting the filtered DC power to a drive power for an electric load.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections.

Further, when used herein (including in the claims), the words "about," "generally," "substantially," "approximately," and the like mean within a range of plus or minus 10% unless otherwise stated herein.

Generally, HVAC systems are used to heat and/or cool building spaces. These systems can vary in complexity, but they often include a refrigerant circuit used to transfer thermal energy into and out of a working fluid, which is typically one or more refrigerant fluids. These systems typically use a compressor to circulate the working fluid through the refrigerant circuit. The compressor includes an electric motor. In many embodiments, a power converter is used to transform mains power into drive power for the electric motor. However, in existing systems, conventional power converters have been found by the inventors to cause sufficient leakage current that could trip a GFCI, if one were present. For instance, the use of a single pole filter and/or the use of oversized capacitors may result in sufficient leakage current to trip a GFCI. Thus, existing systems may fail to reliably or properly operate when the power converter is connected to an electrical circuit with a GFCI.

Accordingly, one or more embodiments disclosed hereby include power converters configured to sufficiently reduce leakage current to prevent operation of the power converter from tripping a GFCI. In at least one embodiment, the power converter is included in a variable speed motor drive, such as for an electric motor in a variable speed compressor of an HVAC system. In some embodiments, the power converter may be utilized for a blower motor, condenser fan motor, liquid pumps (e.g., pool pumps), and the like. More generally, embodiments described hereby may cover electric motor drives without departing from the scope of this disclosure. Due to high frequency components of common mode noise resulting in sufficient leakage current to trip a GFCI, many embodiments disclosed herein are advantageously directed to facilitating compatibility of power converters with electrical circuits having a GFCI by reducing leakage current in the power converters to below a trip threshold of the GFCI. As used herein, the compatibility of a power converter with respect to a GFCI may refer to the ability to reliably function under normal conditions without tripping the GFCI. The power converters disclosed hereby include various components to filter and/or reduce common mode noise or high frequency components of the common mode noise while maintaining leakage current below a trip threshold of a GFCI device (e.g., 4-6 milliamps (mA) at 60 Hertz (Hz)). For example, a multi-pole common mode filter may be positioned between the DC-to-DC converter and the inverter. In another example, a driver for the DC-to-DC converter may be powered with an isolated power supply. In yet another example, an isolator may be utilized between a power factor correction (PFC) controller and the driver. In yet another example, the DC-to-DC converter and a driver for the DC-to-DC converter may be coupled to an unfiltered DC– ground, the internal components of the multi-pole common mode filter may be coupled to an earth ground, and the inverter may be coupled to a filtered DC– ground. In yet another example, a multi-pole common mode filter may be positioned between the rectifier and the DC-to-DC converter. In yet another example, the bulk storage capacitors may be integrated into a multi-pole common mode filter. Thus, the devices, systems, and methods disclosed hereby can improve compatibility and/or usability of power converters when combined with GFCIs.

Figure 1:
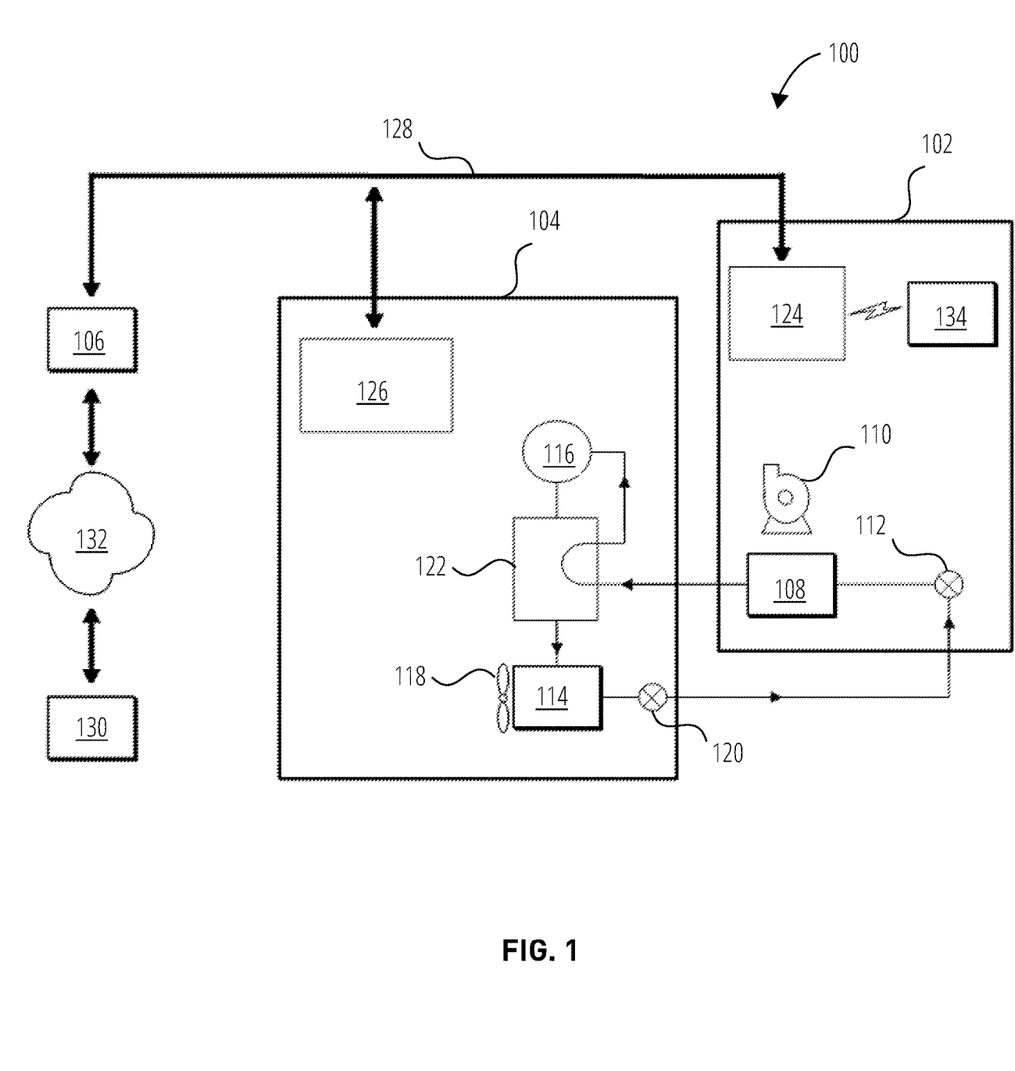
FIG. 1 illustrates various aspects of an HVAC system in accordance with one or more embodiments of the current disclosure.

For context, FIG. 1 is shown to provide an overview an HVAC system generally. FIG. 1 shows a schematic diagram of an exemplary HVAC system 100. In some embodiments, the HVAC system 100 comprises a heat pump system that may be selectively operated to implement one or more substantially closed thermodynamic refrigerant cycles to provide a cooling functionality (hereinafter a "cooling mode") and/or a heating functionality (hereinafter a "heating mode"). At least one embodiment may include a system with only a cooling function or only a heating function. The embodiments depicted in FIG. 1 is configured in a cooling mode. The HVAC system 100, in some embodiments is configured as a split system heat pump system, and generally comprises an indoor unit 102, an outdoor unit 104, and a system controller 106 that may generally control operation of the indoor unit 102 and/or the outdoor unit 104.

FIG. 1 may include one or more components that are the same or similar to one or more other components of the present disclosure. Further, one or more components of FIG. 1, or aspects thereof, may be incorporated into, or excluded from, various embodiments of the present disclosure without departing from the scope of this disclosure. For example, one or more components of outdoor unit 104 and/or one or more components of indoor unit 102 may be incorporated into one or more of the embodiments of FIGS. 2-7 without departing from the scope of this disclosure.

Indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between a refrigerant carried within internal tubing of the indoor heat exchanger 108 and an airflow that may contact the indoor heat exchanger 108 but that is segregated from the refrigerant.

The indoor metering device 112 may generally comprise an electronically controlled motor-driven electronic expansion valve (EEV). In some embodiments, however, the indoor metering device 112 may comprise a thermostatic expansion valve, a capillary tube assembly, and/or any other suitable metering device.

Outdoor unit 104 generally comprises an outdoor heat exchanger 114, a compressor 116, an outdoor fan 118, an outdoor metering device 120, a switch over valve 122, and an outdoor controller 126. The outdoor heat exchanger 114 may generally be configured to promote heat transfer between a refrigerant carried within internal tubing of the outdoor heat exchanger 114 and an airflow that contacts the outdoor heat exchanger 114 but is segregated from the refrigerant. In some embodiments, the outdoor metering device 120 and/or switch over valve 122 may be optional. For example, heat pumps may include an outdoor metering device and a switch over valve, but air conditioners may not. In various embodiments, the outdoor controller 126 may be optional. For example, systems that do not include a heat pump and/or variable speed air conditioner may not include an outdoor controller.

The outdoor metering device 120 may generally comprise a thermostatic expansion valve. In some examples, however, the outdoor metering device 120 may comprise an electronically controlled motor driven EEV similar to indoor metering device 112, a capillary tube assembly, and/or any other suitable metering device.

In some examples, the switch over valve 122 may generally comprise a four-way reversing valve. The switch over valve 122 may also comprise an electrical solenoid, relay, and/or other device configured to selectively move a component of the switch over valve 122 between operational positions to alter the flow path of refrigerant through the switch over valve 122 and consequently the HVAC system 100.

The system controller 106 may generally be configured to selectively communicate with the indoor controller 124 of the indoor unit 102, the outdoor controller 126 of the outdoor unit 104, and/or other components of the HVAC system 100. In some embodiments, the system controller 106 may be configured to control operation of the indoor unit 102, and/or the outdoor unit 104. In some embodiments, the system controller 106 may be configured to monitor and/or communicate with a plurality of temperature sensors associated with components of the indoor unit 102, the outdoor unit 104, and/or the outdoor ambient temperature.

In some examples, the system controller 106 may be configured for selective bidirectional communication over a communication bus 128. In some examples, the system controller 106 may be configured to selectively communicate with components of the HVAC system 100 and/or any other device 130 via a communication network 132.

The indoor controller 124 may be carried by the indoor unit 102 and may generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 may be included in the thermostat.

The indoor EEV controller 134 may be configured to receive information regarding temperatures and/or pressures of the refrigerant in the indoor unit 102. More specifically, the indoor EEV controller 134 may be configured to receive information regarding temperatures and pressures of refrigerant entering, exiting, and/or within the indoor heat exchanger 108.

The outdoor controller 126 may be carried by the outdoor unit 104 and may be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. As will be appreciated, the compressor 116 may include, or be coupled to, an electric motor. In several embodiments, the compressor 116 may include, or be coupled to, one or more power converters and/or electrical loads discussed hereby. For example, compressor 116 may include, or be coupled to, power converter 204 and/or electrical load 206. In various embodiments, the power converter may form a portion of the compressor drive. In at least one embodiment, the power converter may be on the same circuit board as the outdoor controller 126. In some embodiments, the power converter and the outdoor controller may be on separate circuit boards that are included in a drive assembly.

Figure 2:
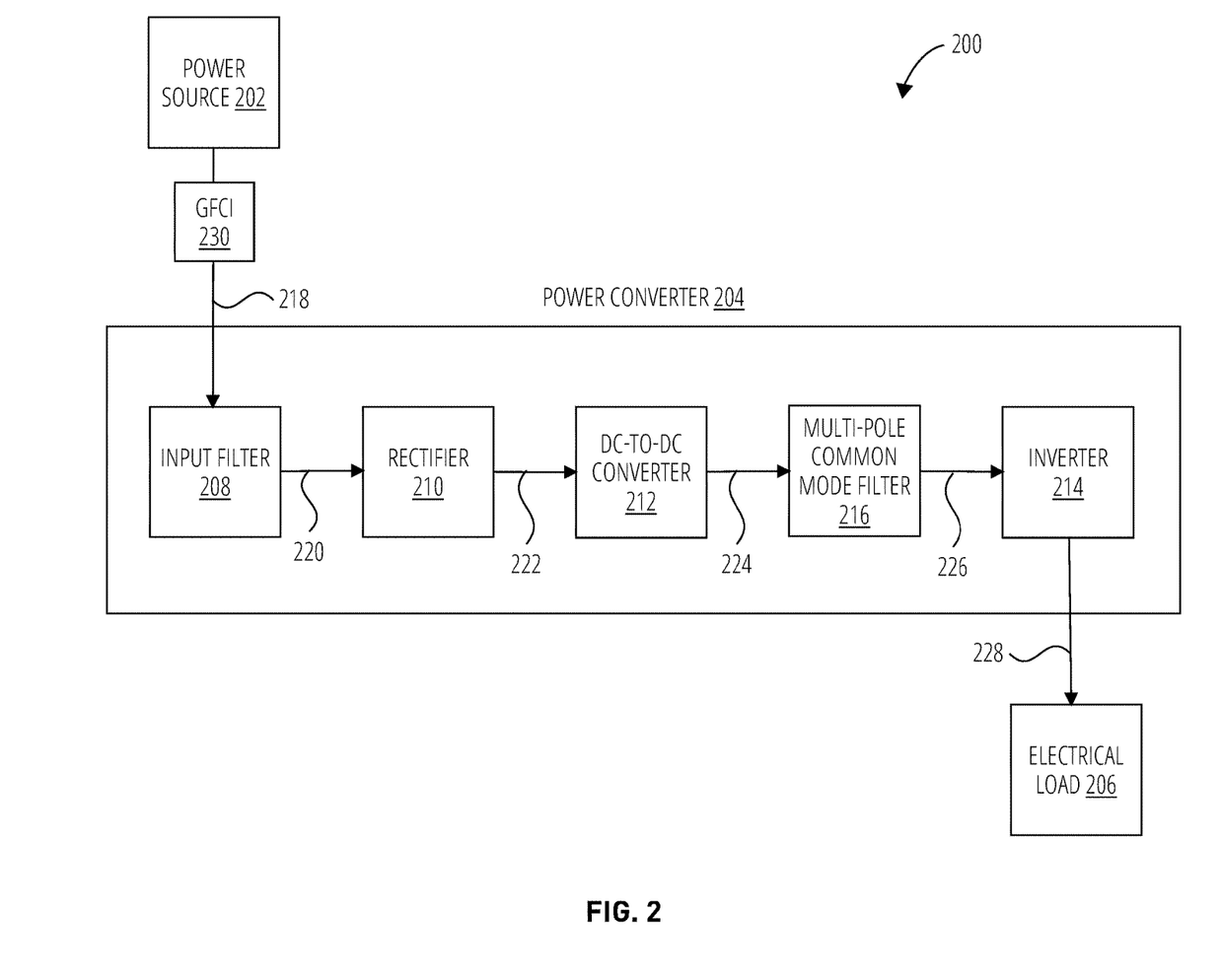
FIG. 2 illustrates an exemplary operating environment of a power converter in accordance with one or more embodiments of the current disclosure.

FIG. 2 illustrates an exemplary operating environment 200 for a power converter 204 according to one or more embodiments of the current disclosure. Operating environment 200 includes a power source 202, a GFCI 230, the power converter 204, and an electrical load 206. Generally, the power converter 204 may operate to convert mains power 218 received from the power source 202 into drive power 228 for operating the electrical load 206. For example, the power converter 204 may convert a mains power of 220 volts and 60 Hz into a drive power of a selectable voltage and/or frequency for driving an electrical load comprising a variable speed motor of an HVAC compressor. In the illustrated embodiment, the power converter 204 includes an input filter 208, a rectifier 210, a DC-to-DC converter 212, a multi-pole common mode filter 216, and an inverter 214. As shown in FIG. 2, the input filter 208 may convert the mains power 218 into a filtered AC input power 220; the rectifier 210 may convert the AC input power 220 into a DC power 222 with a first voltage; the DC-to-DC converter 212 may convert the DC power 222 with the first voltage into a DC power 224 with a second voltage; the multi-pole common mode filter 216 may convert the DC power 224 with the second voltage into a filtered DC power 226; and the inverter 214 may convert the filtered DC power 226 into drive power 228 for the electrical load 206.

In some embodiments, FIG. 2 may include one or more components that are the same or similar to one or more other components of the present disclosure. For example, the electrical load 206 may be the same or similar to the compressor 116. In various embodiments, the electrical load 206 may include multiple components. For example, a compressor may form the majority of the electrical load and one or more of an outdoor controller and a condenser fan motor may additionally form a portion of the electrical load 206. Further, one or more components of FIG. 2, or aspects thereof, may be incorporated into, or excluded from, various embodiments of the present disclosure without departing from the scope of this disclosure. For example, input filter 208 may be excluded from power converter 204 without departing from the scope of this disclosure. In another example, GFCI 230 may be incorporated into the embodiments of FIGS. 1 and 3-7 without departing from the scope of this disclosure. In yet another example, power converter 204 may be incorporated into HVAC system 100 without departing from the scope of this disclosure. The power source 202 may include a power distribution panel, such as a breaker box that is connected to a power supply (e.g., utility grid, generator, battery, and the like).

In some embodiments, the power converter 204 may be integrated into the electrical load 206. In various embodiments, the GFCI 230, power converter 204, and electrical load 206 may form a portion of an electrical circuit in a residential house, such as for powering an HVAC system. Some embodiments may be adapted for use with DC microgrids. For example, rectifier 210 may be removed to adapt power converter 204 to be compatible with DC microgrids. The electrical load 206 may include electrical loads driven by, or including, DC-to-DC converters and/or inverter-driven motors. For example, electrical load 206 may include one or more of an air handler blower, an electric vehicle charger, photovoltaic inverters, battery storage systems, and the like. In fact, most modern appliances include DC-DC converters and inverter-driven motors. In some embodiments, the power converter 204 may include, or be referred to as, a DC-DC converter.

In many embodiments, the multi-pole common mode filter 216 may remove a high frequency component from the DC power 224 of the second voltage to produce a filtered DC power 226. In many such embodiments, multi-pole common mode filter 216 may be configured to remove frequencies over a threshold (e.g., be a low-pass filter or a band-stop filter). For example, the threshold may be 150 Hz. In another example, the threshold may be 1 kHz. In yet another example, the multi-pole common mode filter 216 may filter out frequencies between 4 and 20 kHz. Additionally, the multi-pole common mode filter 216 may reduce or prevent the high frequency components from passing to ground. More generally, the multi-pole common mode filter may be configured to minimize loss at DC (0 Hz) while maximizing rejection of the switching frequency of the power converter (e.g., 5 kHz, 7 kHz, 17 kHz, etcetera). The exact cutoff frequency will depend on the application and/or designer. In one embodiment, the switching frequency of the power converter may comprise the rate at which the DC voltage is switched on and off during a pulse width modulation process, such as by inverter 214.

In some embodiments, the multi-pole common mode filter 216 may be a passive filter. In other embodiments, the multi-pole common mode filter 216 may be an active filter. The input filter 208 may be the same or similar to the multi-pole common mode filter 216. Accordingly, although not explicitly discussed, the input filter 208 may be configured in a same or similar manner as one or more of the disclosed multi-pole common mode filters. In one embodiment, the input filter 208 may be moved to between the rectifier 310 and the DC-to-DC converter 212.

Removal of the high frequency component by the multi-pole common mode filter 216 produces a leakage current below the tripping threshold of the GFCI 230. More generally, GFCI 230 is an electrical safety device that breaks an electrical circuit with leakage current to ground. GFCIs can protect equipment and reduce the risk of serious harm from an ongoing electric shock. GFCIs are designed to isolate a circuit quickly and automatically when it detects that the electric current is unbalanced between the supply and return conductors of a circuit. Any difference between the currents in these conductors indicates leakage current, which presents a shock hazard. Alternating 60 Hz current through the human body can be sufficient to cause cardiac arrest or serious harm if it persists. For example, at 40 mA, it may take several seconds to cause cardiac arrest or serious harm. However, at 400 mA it would only take approximately 1/10 of a second to cause cardiac arrest or serious harm. Accordingly, GFCIs are designed to disconnect the conducting wires quickly enough to prevent serious injury to humans and damage to electrical devices. In some embodiments, the GFCI may be replaced with, or include a residual-current device (RCD) or a residual-current circuit breaker (RCCB). In one embodiment, the trip threshold may differentiate an RCD and a GFCI. For example, an RCD may have a trip threshold of 20 milliamps and a GFCI may have a trip threshold between 4 and 6 milliamps. In some such embodiments, the trip thresholds may assume an alternating current of 60 Hz.

In some embodiments, the GFCI 204 may monitor the flow of power on a supply conductor and a return conductor of an electrical circuit, and, when the flow on the return conductor is more than a threshold difference from the flow on the supply conductor, disconnect the power converter 204 and electrical load 206 from the power source 202. As will be appreciated, in various embodiment described hereby, the supply conductor may include the positive legs (e.g., DC+) and the return conductor may include the negative legs (e.g., DC−). A current imbalance in the electrical circuit can result from a leakage current. For example, the inventors have identified that a leakage current can flow to ground (e.g., earth ground 334a (see FIG. 3)) in a manner that causes the GFCI 230 to trip when a single-pole common model filter is used in place of multi-pole common mode filter 216, such as in existing systems. This results from the single-pole common mode filter of existing systems causing excessive leakage current for the same amount of electromagnetic interference (EMI) reduction when compared to multi-pole common mode filter 216.

In many embodiments, the power converter 204 is configured to maintain leakage current to below a trip threshold of the GFCI 230. For example, the power converter 204 can be configured to reduce leakage current to less than 3.5 mA to prevent a GFCI with a trip threshold of 4-6 mA at 60 Hz from tripping. Also, as discussed above with respect to the multi-pole common mode filter 216, the power converter 204 may be configured such that only leakage currents below a threshold frequency (e.g., below 150 Hz or below 1 kHz) occur during normal operation. More generally, the multi-pole common mode filter 216 is configured to reduce common mode noise from the input of the filter to the output of the filter. Single-pole filters may accomplish this by shunting noise to ground (causing leakage current). However, the multi-pole common mode filter 216 utilizes a combination of high series impedance (e.g., from common mode chokes) and low shunt impedance (e.g., from y-capacitors) to sufficiently reduce common mode noise without producing sufficient leakage current to trip a GFCI (e.g., GFCI 230). Accordingly, single-pole and multi-pole common mode filters can turn some noise into leakage current, but the multi-pole filter can accomplish the same noise reduction with less leakage.

In various embodiment, the maximum leakage current allowed by a power converter 204 disclosed hereby may be configured based on the trip threshold of the circuit protection device for a specific application. For instance, Underwriters' Laboratories®, in UL 943 covering ground-fault circuit interrupters intended for use only in alternating-current circuit wherein one of the wires is grounded in accordance with the National Electrical Code®, has defined that a Class A GFCI will trip when the current to ground has a value in the range of 4-6 mA at 60 Hz. Accordingly, leakage current may be maintained below 4 mA. In many embodiments, the leakage current may be maintained at a safety margin below the trip threshold. For example, with a trip threshold of 4 mA, a safety margin of 1 mA would result in a maximum leakage current of 3 mA and a safety margin of 0.5 mA would result in a maximum leakage current of 3.5 mA.

Figure 3:
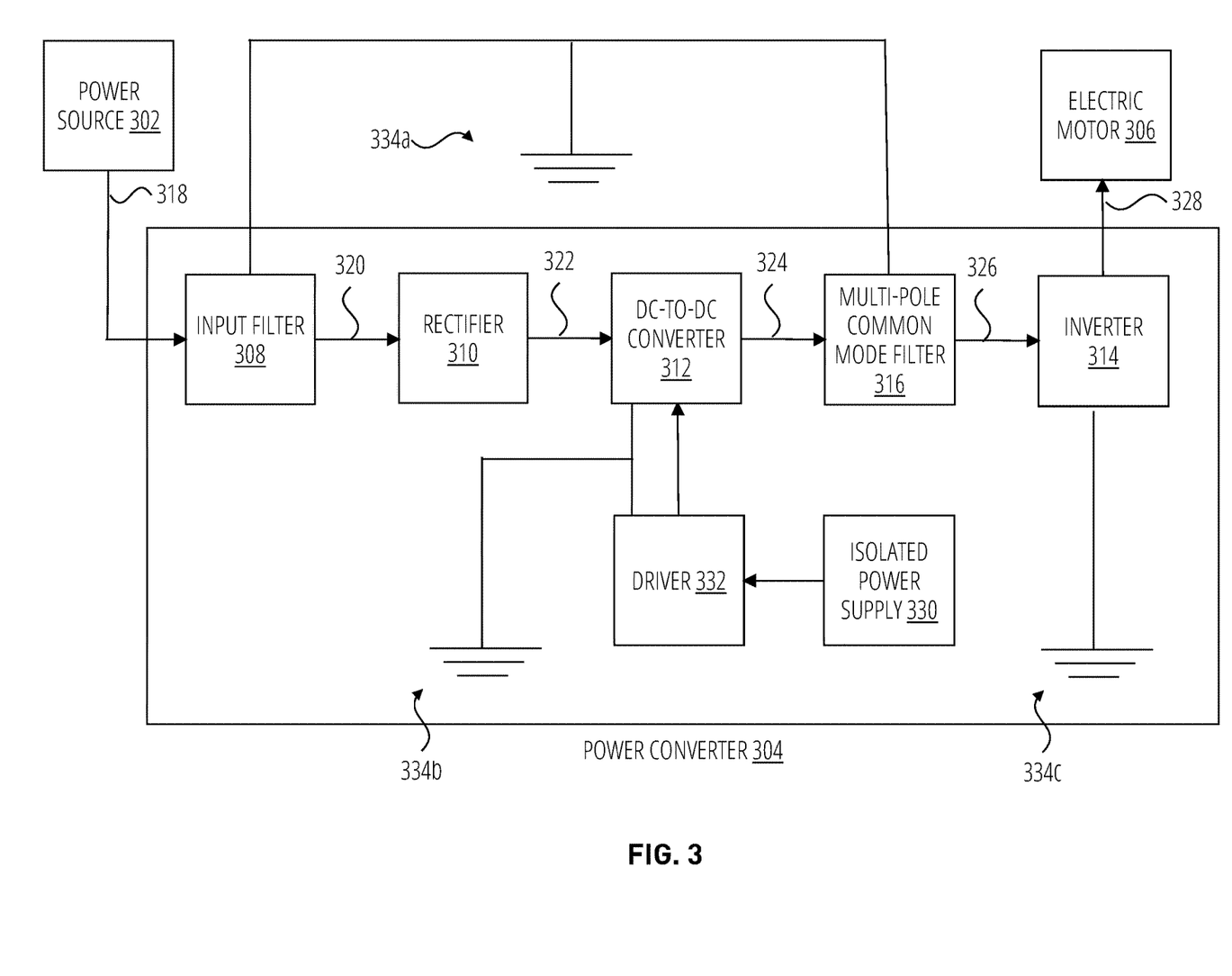
FIG. 3 illustrates various aspects of a power converter in accordance with one or more embodiments of the current disclosure.

FIG. 3 illustrates various aspects of a power converter 304 according to one or more embodiments of the current disclosure. Power converter 304 is illustrated in conjunction with a power source 302 and an electric motor 306. Although not illustrated, it will be appreciated that the power converter 304 may form a portion of an electrical circuit comprising a GFCI (e.g., GFCI 230, FIG. 2). In addition to the components of power converter 204, power converter 304 includes a driver 332 for the DC-to-DC converter 312 and an isolated power supply 330 for the driver 332. FIG. 3 also illustrates the input filter 308 and the multi-pole common mode filter 316 tied to earth ground 334a, the DC-to-DC converter 312 and driver 332 tied to an unfiltered DC− ground 334b, and the inverter 314 tied to a filtered DC− ground 334c.

In some embodiments, FIG. 3 may include one or more components that are the same or similar to one or more other components of the present disclosure. For example, the power converter 304 may be the same or similar to the power converter 204. Further, one or more components of FIG. 3, or aspects thereof, may be incorporated into, or excluded from, various embodiments of the present disclosure without departing from the scope of this disclosure. For example, power converter 304 may be incorporated into HVAC system 100. In another example, the isolated power supply 330 may be incorporated into power converter 204.

The input filter 308 may convert the mains power 318 into an AC input power 320; the rectifier 310 may convert the AC input power 320 into a DC power 322 with a first voltage; the DC-to-DC converter 312 may convert the DC power 322 with the first voltage into a DC power 322 with a second voltage; the multi-pole common mode filter 316 may convert the DC power 324 with the second voltage into a filtered DC power 326; and the inverter 314 may convert the filtered DC power 326 into drive power 328 for the electric motor 306. In one embodiment, the electric motor 306 operates a variable speed compressor of an HVAC system.

Connecting the multi-pole common mode filter 316 to earth ground 334a while having separate grounds for unfiltered DC and filtered DC (unfiltered DC− ground 334b and filtered DC− ground 334c) can prevent or reduce high frequency components in common mode noise in a manner that produces a leakage current below the trip threshold of a GFCI.

Additionally, or alternatively, the isolated power supply 330 can prevent the power supply of the driver 332 for the DC-to-DC converter 312 from introducing unwanted noise into a portion of the electrical circuit comprising the GFCI. More generally, one or more isolators may be utilized to keep filtered power separate from unfiltered power. Accordingly, isolators may be placed between components utilizing filtered power and components utilizing unfiltered power. In several embodiments, the isolated power supply 330 is utilized to keep filtered power separate from unfiltered power because, unlike most of the components in the system receive filtered power, the driver 330 may receive unfiltered (or isolated) power. Accordingly, in embodiments described hereby, one or more of a multi-pole common mode filter, an isolated power supply, and separated grounds may be utilized to facilitate the compatibility of power converter 304 with a GFCI protected circuit.

Figure 4A:
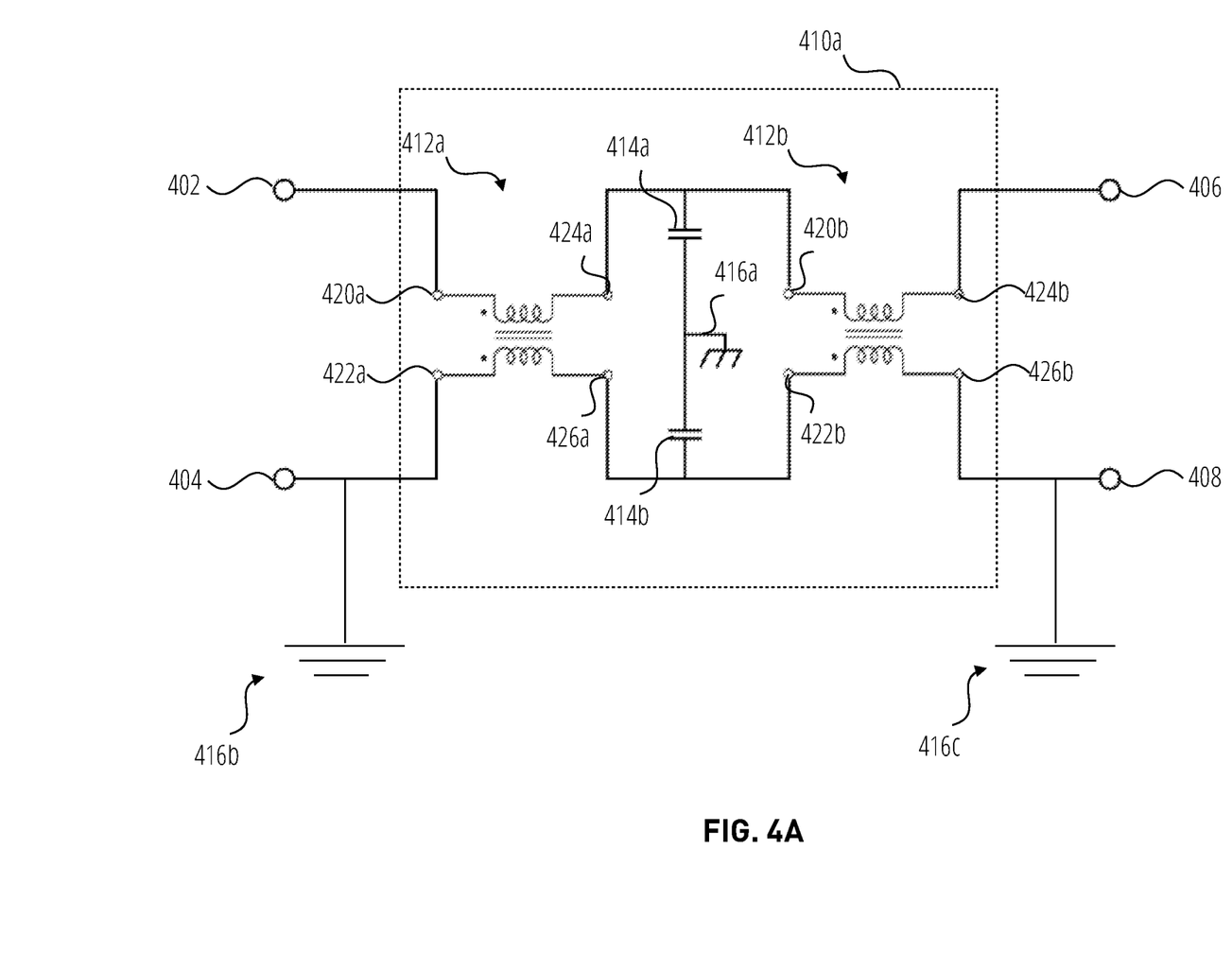
FIGS. 4A and 4B illustrate various embodiments of a multi-pole common mode filter in accordance with one or more embodiments of the current disclosure.
Figure 4B:
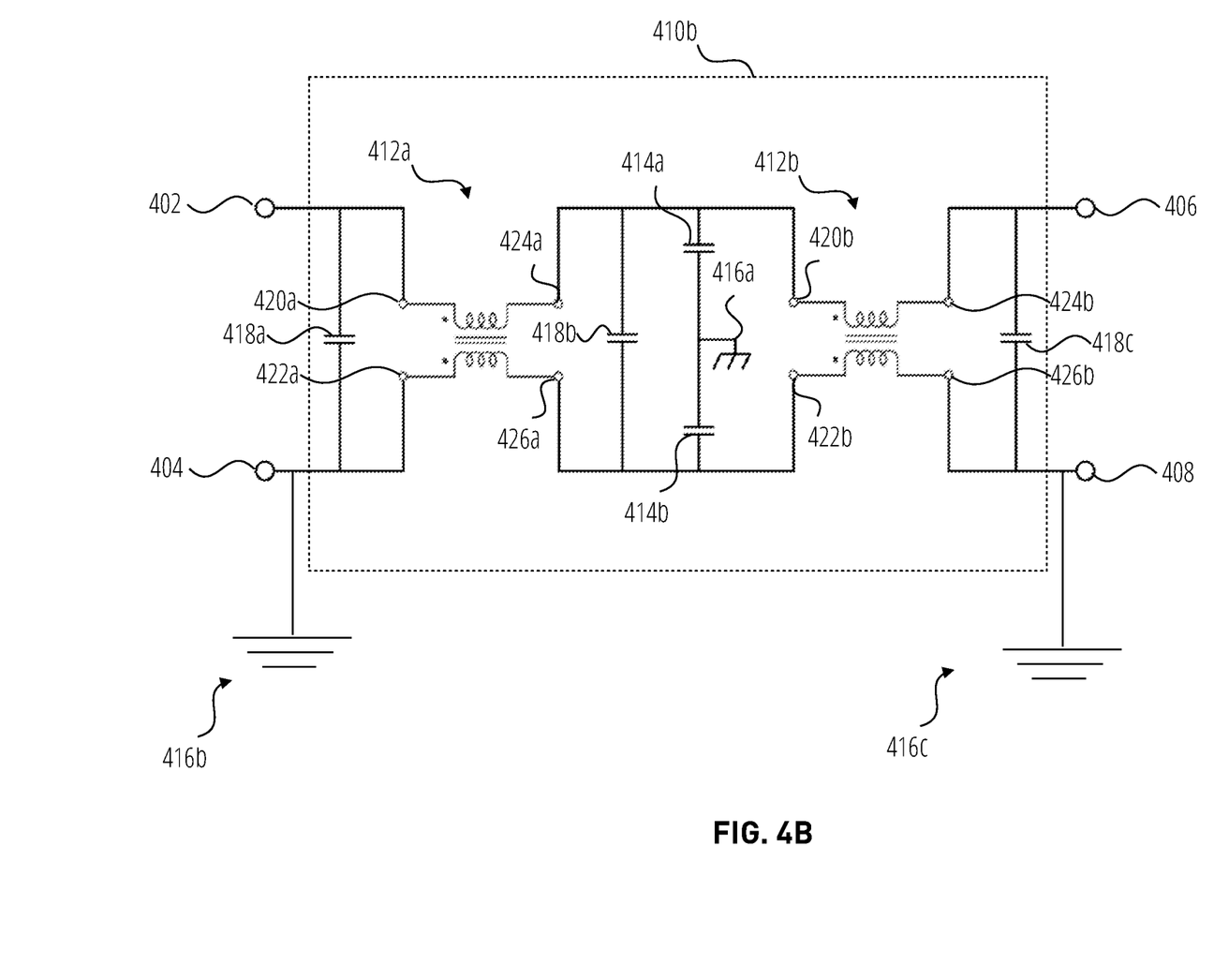

FIGS. 4A and 4B illustrate various embodiments of a multi-pole common mode filter according to one or more embodiment of the current disclosure. More specifically, FIG. 4A illustrates a first multi-pole common mode filter 410a and FIG. 4B illustrates a second multi-pole common mode filter 410b. The multi-pole common mode filters 410a, 410b may be configured to remove a high frequency component from common mode noise in a manner that produces a leakage current below the trip threshold of a GFCI. In several embodiments, the multi-pole common mode filters 410a, 410 may utilize a combination of high series impedance from common mode chokes (e.g., common mode chokes 412a, 412b) and low shunt impedance from y-capacitors (e.g., capacitors 414a, 414b) to sufficiently reduce common mode noise without producing sufficient leakage current to trip a GFCI.

In some embodiments, FIGS. 4A and 4B may include one or more components that are the same or similar to one or more other components of the present disclosure. For example, the multi-pole common mode filter 410a may be the same or similar to the multi-pole common mode filter 216 or multi-pole common mode filter 316. Further, one or more components of FIGS. 4A and 4B, or aspects thereof, may be incorporated into, or excluded from, various embodiments of the present disclosure without departing from the scope of this disclosure. For example, capacitor 418b may be incorporated into multi-pole common mode filter 410a. In another example, common mode choke 412b may be excluded from multi-pole common mode filter 410a.

In yet another example, capacitor 418a may be excluded from multi-pole common mode filter 410b.

Referring to FIG. 4A, the first multi-pole common mode filter 410a includes a positive input terminal 402, a negative input terminal 404, a positive output terminal 406, and a negative output terminal 408. The negative input terminal 404 may be connected to an unfiltered DC– ground 416b and the negative output terminal 408 may be connected to a filtered DC– ground 416c. The internal components of the multi-pole common mode filter 410a include first and second common mode chokes 412a, 412b and first and second capacitors 414a, 414b. The first and second common mode chokes 412a, 412b may each include, respectively, a positive choke input terminal 420a, 420b, a negative choke input terminal 422a, 422b, a positive choke output terminal 424a, 424b, and a negative choke output terminal 426a, 426b.

The positive and negative choke input terminals 422a, 422b may be connected to, or include, the positive and negative input terminals 402, 404, respectively. Similarly, the positive and negative choke output terminals 424b, 426b may be connected to, or include, the positive and negative output terminals 406, 408, respectively. Accordingly, the positive input terminal 402 and positive choke input terminal 420a may be at the same voltage (unfiltered DC+), the negative input terminal 404 and negative choke input terminal 422a may be at the same voltage (unfiltered DC–), the positive output terminal 406 and positive choke output terminal 424b may be at the same voltage (filtered DC+), and the negative output terminal 408 and negative choke output terminal 426b may be at the same voltage (filtered DC–).

The first capacitor 414a may be coupled between the positive choke output terminal 424a and earth ground 416a as well as between the positive choke input terminal 420b and the earth ground. Similarly, the second capacitor 414b may be coupled between the negative choke output terminal 426a and the earth ground 416a as well as between the negative choke input terminal 422b and the earth ground 416a. The capacitors 414a, 414b may include y-capacitors. In various embodiments, the capacitors 414a, 414b are below 25 nanofarads, such as 20 nanofarads. For example, the capacitors 414a, 414b may be between 0 and 10 nanofarads. In some such example, the capacitors 414a, 414b may be 4.7 nanofarads. In many embodiments, the capacitors 414a, 414b may include high frequency capacitors. Although the multi-pole common mode filter 410a comprises a three-pole filter. It will be appreciated that the number of poles in the filter may be determined based on application.

For example, a two-pole filter, such as one that omits common mode choke 412b may provide sufficient noise reduction at an acceptable leakage current. Conversely, if a three-pole filter does not provide sufficient noise reduction at an acceptable leakage current, a fourth pole could be added as a pair of shunt capacitors from positive choke output terminal 424b to earth ground 416a and negative choke output terminal 426b to earth ground 416a. In a further such embodiment, the capacitance of capacitors 414a, 414b may be reduced as part of utilizing a four-pole filter when a three-pole filter does not provide sufficient noise reduction at an acceptable leakage current.

Referring to FIG. 4B, the second multi-pole common mode filter 410b includes the same components as the first multi-pole common mode filter 410a with the addition of capacitors 418a, 418b, 418c. In some embodiments, one or more of capacitors 418a, 418b, 418c may include bulk storage capacitors. In various embodiments, the addition of the capacitors 418a, 418b, 418c may improve the ability of multi-pole common mode filter 410b to filter common mode noise and/or remove high frequency components without producing sufficient leakage current to trip a GFCI. For example, the capacitors 418a, 418b, 418c may reduce differential model noise (as opposed to common mode noise). Reducing differential mode noise can help mitigate imbalances between capacitor 414a and capacitor 414b (and voltage imbalances between the positive input terminal 402 and the negative input terminal 404.

The first capacitor 418a may be coupled between the positive and negative input terminals 402, 404. The second capacitor 418b may be coupled between the positive choke output terminal 424a and the negative choke output terminal 426a. Similarly, the second capacitor 418b may be coupled between the positive choke input terminal 420b and the negative choke input terminal 422b. As will be appreciated, the positive choke output terminal 424a and the positive choke input terminal 420b may be at the same voltage and the negative choke output terminal 426a and negative choke input terminal 422b may be at the same voltage. The third capacitor 418c may be coupled between the positive and negative output terminals 406, 408. In some embodiments, one or more of the capacitors 418a, 418b, 418c may be incorporated into the multi-pole common mode filter 410a. In some embodiments, capacitors 414a, 414b may be referred to as y-capacitors (i.e., line-to-ground) and capacitors 418a, 418b, 418c may be referred to as x-capacitors (i.e., line-to-line). In one exemplary embodiment, capacitors 414a, 414b may include 22 nF capacitors, capacitors 418a, 418b, 418c may include 2.2 µF capacitors, and common mode chokes 412a, 412b may include 1.5 mH common mode chokes. In another exemplary embodiment, capacitors 414a, 414b may include 22 nF capacitors, capacitors 418a, 418b, 418c may include 6.8 µF capacitors, and common mode chokes 412a, 412b may include 1.5 mH common mode chokes.

Figure 5:
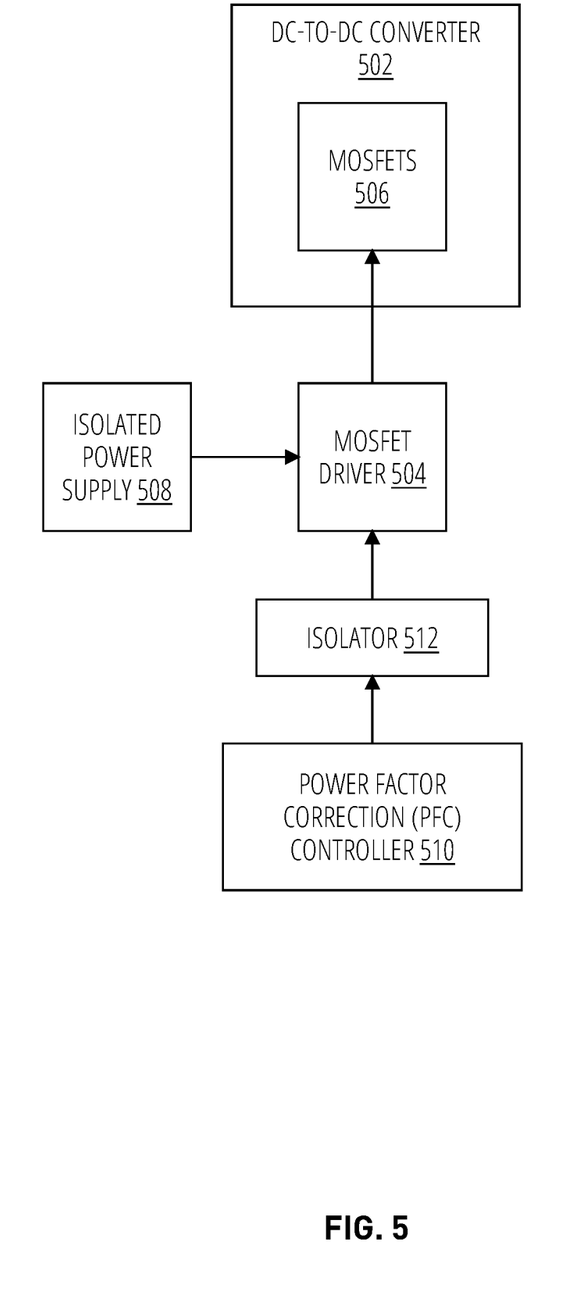
FIG. 5 illustrates various aspects of driving a DC-to-DC converter in accordance with one or more embodiments of the current disclosure.

FIG. 5 illustrates various aspects of driving a DC-to-DC converter 502 according to one or more embodiments of the current disclosure. The DC-to-DC converter 502 includes MOSFETs 506 and is shown in conjunction with a MOSFET driver 504, an isolated power supply 508, a PFC controller 510, and an isolator 512. In various embodiments, the MOSFET driver 504 is utilized to operate the MOSFETs 506 in the DC-to-DC converter 502. The isolator 512 may be utilized to prevent the passage of noise from the PFC controller 510 to the MOSFET driver 504. Similarly, the isolated power supply 508 may be utilized to prevent the passage of noise from the power supply to the MOSFET driver 504. In some embodiments, FIG. 5 may include one or more components that are the same or similar to one or more other components of the present disclosure. For example, DC-to-DC converter 502 may be the same or similar to DC-to-DC converter 212. Further, one or more components of FIG. 5, or aspects thereof, may be incorporated into, or excluded from, various embodiments of the present disclosure without departing from the scope of this disclosure. For example, PFC controller 510 and isolator 512 may be incorporated into power converter 304. In another example, the isolator 512 may be excluded without departing from the scope of this disclosure.

In several embodiments, the MOSFET driver 504 and/or DC-to-DC converter 502 may be a source, or conduit, of unwanted noise contributing to excessive leakage current and incompatibility with GFCIs. Utilizing isolator 512 and/or isolated power supply 508 can prevent the circuit of the MOSFET driver 504 from bypassing part of the multi-pole common mode filter (e.g., the ground). In several embodiments, isolators may be utilized when a transmitter and a receiver have different ground references. In many embodiments, isolator 512 and/or isolated power supply 508 may be utilized to reduce the effects of this unwanted noise that contribute to excessive leakage current and incompatibility with GFCIs. As previously mentioned, in some embodiments, the isolator 512 may not be included. For instance, the isolator 512 may be excluded when the PFC controller 510 and the MOSFET 506 share a ground. In either case, enable signals to the MOSFET driver 504 are isolated.

More generally, one or more isolators may be utilized with various components of power converters disclosed hereby to prevent the passage of noise between the components, and thereby reduce the effects of unwanted noise that contribute to excessive leakage current and incompatibility with GFCIs. In various embodiments, the MOSFET driver 504 supply may be powered from positive and negative input terminals of the multi-pole common mode filter (e.g., positive input terminal 402 and negative input terminal 404). In various such embodiments, other power supplies are coupled to positive and negative output terminals of the multi-pole common mode filter (e.g., positive output terminal 406 and negative output terminal 408). In one embodiment, the MOSFET driver supply may be powered from the positive and negative output terminals of the multi-pole common mode filter.

The isolated power supply 508 may include a controller, a transformer (isolates the input from the output), and an isolator integrated circuit (isolates the feedback signal from the output to the controller). In various embodiments, isolators may be utilized to pass signals from the power supply controller to the MOSFET driver and/or from the current sense resistor to an ADC.

Figure 6A:
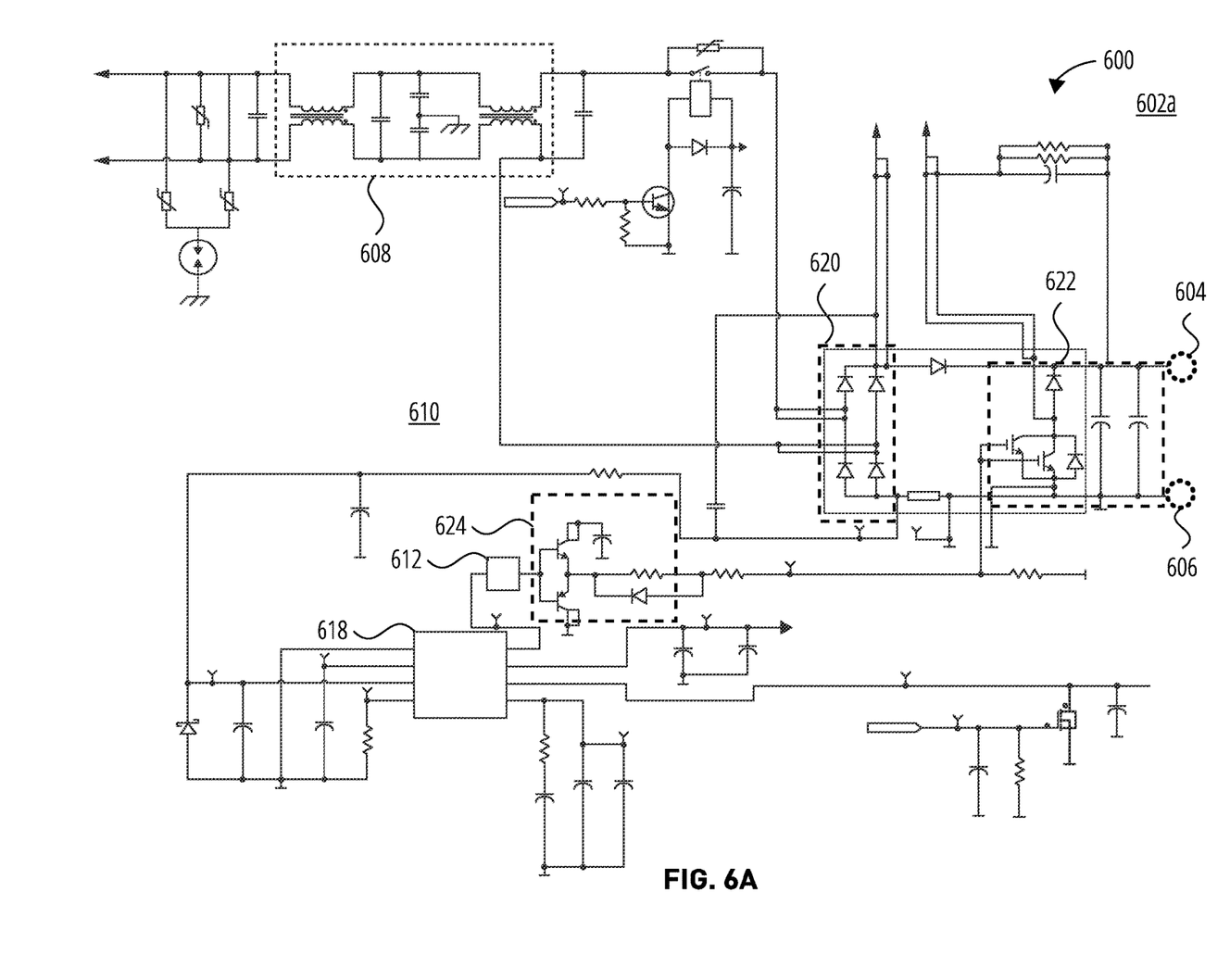
FIGS. 6A and 6B illustrate an exemplary circuit diagram in accordance with one or more embodiments of the current disclosure.
Figure 6B:
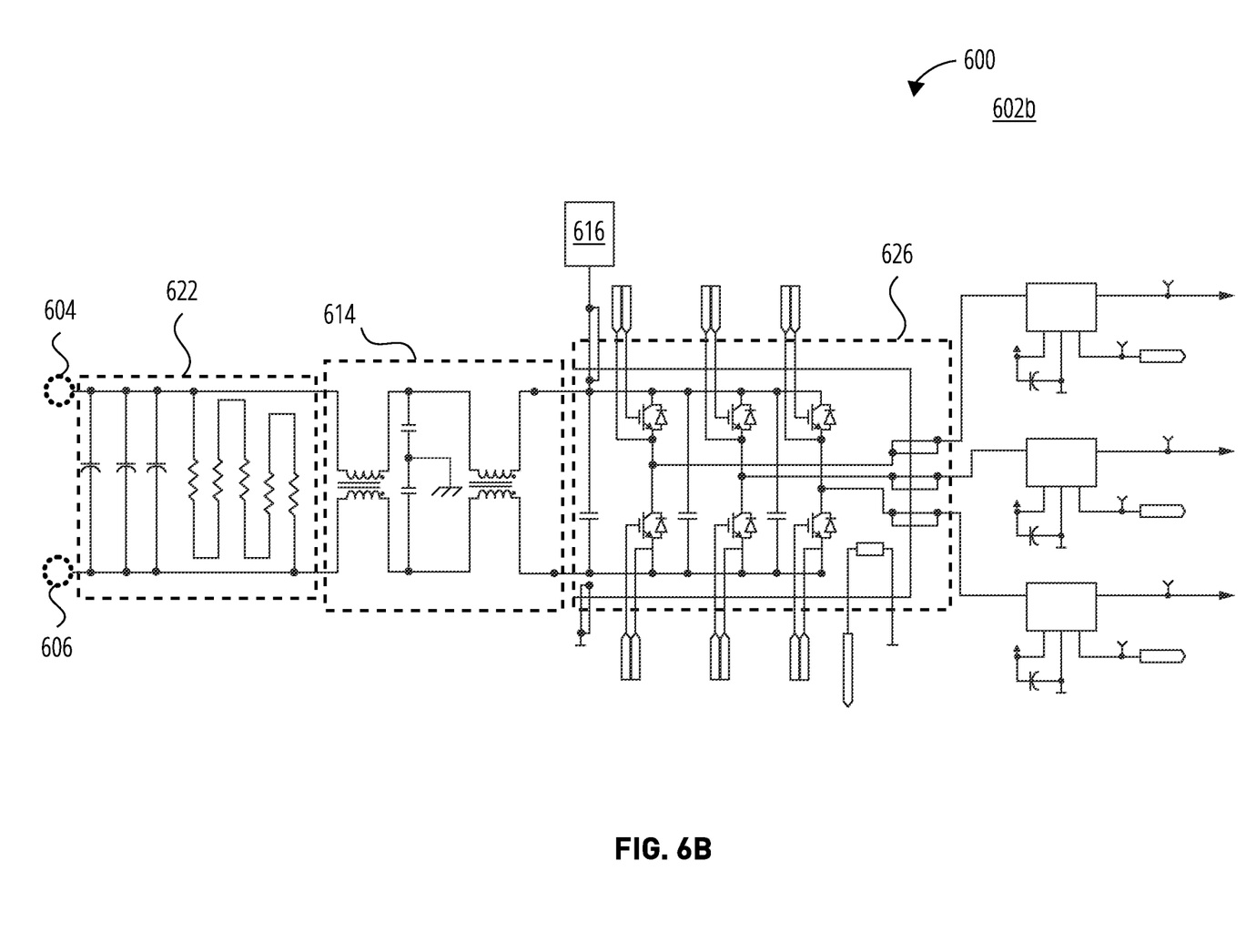

For example, the power supply of the MOSFET driver 504 may be sourced from, or comprise, a second DC-to-DC converter, such as one coupled to the source pin 616 of FIG. 6B. In one such example, the second DC-to-DC converter may be connected (e.g., directly or via a current sensing resistor) to an analog to digital converter (ADC) using an isolator. Accordingly, in one embodiment, a second DC-to-DC converter connected, via an isolator, to an ADC connected to MOSFET driver 504 may be utilized in place of isolated power supply 508. The isolators described hereby may include one or more of a capacitive, inductive, radiative, optical, acoustic, and mechanical isolators. In some embodiments, the DC-to-DC converter 502 includes a buck-boost converter. In many embodiments, the isolated power supply 508 may comprise a low voltage power supply.

FIGS. 6A and 6B illustrate a circuit diagram 600 of one or more portions of a power converter according to one or more embodiment of the current disclosure. More specifically, FIG. 6A illustrates a first portion 602a of circuit diagram 600 and FIG. 6B illustrates a second portion 602b of circuit diagram 600. The first portion 602a connects to the second portion 602b at each of the positive and negative connections 604, 606. The circuit diagram 600 illustrates an exemplary implementation of various techniques described herein. The circuit diagram 600 illustrates a power converter including an input filter 608, an isolated power source 610, an isolator 612, a multi-pole common mode filter 614, a source pin 616, a PFC controller 618, a rectifier 620, a DC-to-DC converter 622 (having a first section in the first portion 602a and a second section in the second portion 602b), a driver 624, and an inverter 626. The symbols and connections of the circuit diagram 600 will be appreciated by one of ordinary skill in the art. In some embodiments, circuit diagram 600 may include one or more components that are the same or similar to one or more other components of the present disclosure. For example, the multi-pole common mode filter 614 may be the same or similar to the multi-pole common mode filter 216 or multi-pole common mode filter 316. In another example, driver 624 may be the same or similar to driver 332 or MOSFET driver 504. Further, one or more components of circuit diagram 600, or aspects thereof, may be incorporated into, or excluded from, various embodiments of the present disclosure without departing from the scope of this disclosure. For example, isolated power source 610 may be incorporated into power converter 304. In another example, isolator 612 and PFC controller 618 may be incorporated into power converter 204.

In some embodiments, the isolator 612 may not be included. For example, if all components in the first portion 602a of circuit diagram 600 share a common ground, then the isolator 612 may be excluded. In either case, enable signals to the driver 624 are isolated. More generally, isolators may be utilized when the transmitter and receiver have different ground references. For example, if a microcontroller was connecting a first circuit component in the first portion 602a of the circuit diagram 600 to a second circuit component in the first portion 602b of circuit diagram 600.

In some embodiments, additional capacitors (e.g., bulk storage capacitors) may be integrated into the filter 614. In several embodiments one or more of the capacitors in DC-to-DC converter 622 may be integrated into the filter 614. In many embodiments, the capacitors in DC-to-DC converter 622 may include bulk storage capacitors and/or high frequency capacitors, which may be configured to mitigate differential noise. In many such embodiments, one or more of the bulk storage capacitors of DC-to-DC converter 622 may be incorporated into filter 614. For example, one or more of capacitors 418a, 418b, 418c may be incorporated into filter 614 in place of one or more of the bulk storage capacitors of DC-to-DC converter 622, such as for differential noise mitigation. In one such example, two of the bulk storage capacitors in DC-to-DC converter 622 may be moved to the filter 614 (such as capacitor 418a in FIG. 4) and/or two of the bulk storage capacitors in DC-to-DC converter 622 may be moved to the filter 614 (such as capacitor 418c).

However, in my prototype I moved two of the large bulk storage capacitors 622 to 418a and two of the capacitors 622 to 418c.

Referring back to the input filter 608, in one embodiment, the input filter 608 may utilize 22 nanofarad y-capacitors, 2.2 microfarad x-capacitors, and 1.5 millihenry common mode chokes. In some embodiments, the filter 614 may utilize the same size components as the input filter 608. In one embodiment, the components of filter 614 may be smaller than the components of input filter 608.

Figure 7:
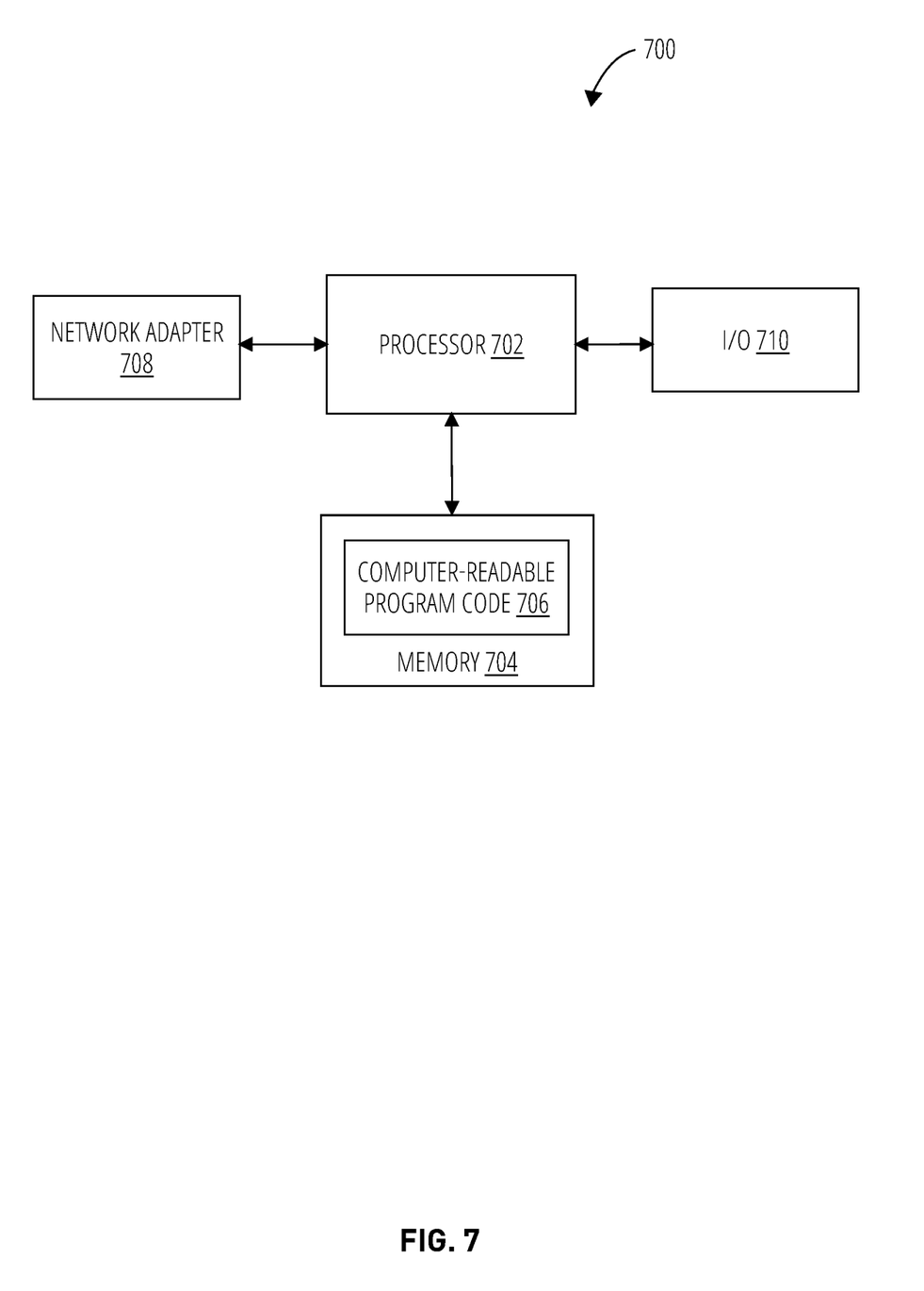
FIG. 7 illustrates exemplary control circuitry in accordance with one or more embodiments of the current disclosure.

FIG. 7 illustrates the control circuitry 700 according to some example embodiments of the present disclosure. In some examples the control circuit includes some or all of the system controller 106, the indoor controller 124, the outdoor controller 126, and/or PFC controller 618. More generally, control circuitry 700 may be utilized to selectively operate various components described hereby, such as electrical load 206, electric motor 306, power converter 204, power converter 304, and/or driver 332. In some examples, the control circuitry 700 may include one or more of each of a number of components such as, for example, a processor 702 connected to a memory 704. The processor 702 is generally any piece of computer hardware capable of processing information such as, for example, data, computer programs and/or other suitable electronic information. The processor includes one or more electronic circuits some of which may be packaged as an integrated circuit or multiple interconnected integrated circuits (an integrated circuit at times more commonly referred to as a "chip"). The processor 702 may be a number of processors, a multi-core processor or some other type of processor, depending on the particular embodiment.

The processor 702 may be configured to execute computer programs such as computer-readable program code 706, which may be stored onboard the processor or otherwise stored in the memory 704. In some examples, the processor may be embodied as or otherwise include one or more ASICs, FPGAs, or the like. Thus, although the processor may be capable of executing a computer program to perform one or more functions, the processor of various examples may be capable of performing one or more functions without the aid of a computer program.

The memory 704 is generally any piece of computer hardware capable of storing information such as, for example, data, computer-readable program code 706 or other computer programs, and/or other suitable information either on a temporary basis and/or a permanent basis. The memory may include volatile memory such as random access memory (RAM), and/or non-volatile memory such as a hard drive, flash memory or the like. In various instances, the memory may be referred to as a computer-readable storage medium, which is a non-transitory device capable of storing information. In some examples, then, the computer-readable storage medium is non-transitory and has computer-readable program code stored therein that, in response to execution by the processor 702, causes various components, such as the electric motor 306, the driver 332, the PFC controller 510, and/or, the inverter 626 to perform various operations as described herein, some of which may in turn cause the HVAC system 100 to perform various operations. In one embodiment, operation of an active filter may be controlled by control circuitry 700.

In addition to the memory 704, the processor 702 may also be connected to one or more peripherals such as a network adapter 708, one or more input/output (I/O) devices 710 or the like. The network adapter 708 is a hardware component configured to connect the control circuitry 700 to a computer network to enable the control circuitry to transmit and/or receive information via the computer network. The I/O 710 may include one or more input devices capable of receiving data or instructions for the control circuitry, and/or one or more output devices capable of providing an output from the control circuitry. Examples of suitable input devices include a keyboard, keypad or the like, and examples of suitable output devices include a display device such as a one or more light-emitting diodes (LEDs), a LED display, a liquid crystal display (LCD), or the like.

As explained above and reiterated below, the present disclosure includes, without limitation, the following example implementations.

Clause 1. A heating, ventilation, and air conditioning (HVAC) system comprising: a compressor; an electric motor coupled to the compressor; a rectifier for converting an alternating current (AC) input power into a direct current (DC) power with a first voltage; a DC-to-DC converter for converting the DC power with the first voltage into a DC power with a second voltage; a multi-pole common mode filter for removing a high frequency component from common mode noise in the DC power with the second voltage to produce a filtered DC power, wherein the multi-pole common mode filter comprises a portion of an electrical circuit including a ground fault circuit interrupter (GFCI) and removal of the high-frequency component by the multi-pole common mode filter produces a leakage current below a trip threshold of the GFCI; and an inverter for converting the filtered DC power into a drive power for the electric motor coupled to the compressor.

Clause 2. The system of any of the clauses, wherein the electric motor comprises a variable speed electric motor.

Clause 3. The system of any of the clauses, wherein the trip threshold is 4-6 milliamps.

Clause 4. The system of any of the clauses, wherein the multi-pole common mode filter comprises a positive input terminal, a negative input terminal, a positive output terminal, and a negative output terminal, and wherein the negative input terminal of the multi-pole common mode filter is connected to an unfiltered DC− ground and the negative output terminal of the multi-pole common mode filter is connected to a filtered DC− ground.

Clause 5. The system of any of the clauses, wherein the multi-pole common mode filter includes a first common mode choke having a first positive choke input terminal, a first negative choke input terminal, a first positive choke output terminal, and a first negative choke output terminal.

Clause 6. The system of any of the clauses, wherein the multi-pole common mode filter includes a first capacitor and a second capacitor, the first capacitor coupled between the first positive choke output terminal and an earth ground, and the second capacitor coupled between the first negative choke output terminal and the earth ground.

Clause 7. The system of any of the clauses, wherein the multi-pole common mode filter includes a second common mode choke having a second positive choke input terminal, a second negative choke input terminal, a second positive choke output terminal, and a second negative choke output terminal.

Clause 8. The system of any of the clauses, wherein the first capacitor is coupled between the second positive choke input terminal and the earth ground, and the second capacitor coupled between the second negative choke input terminal and the earth ground.

Clause 9. The system of any of the clauses, wherein the multi-pole common mode filter includes a third capacitor coupled between the first positive choke input terminal and the first negative choke input terminal.

Clause 10. The system of any of the clauses, wherein the multi-pole common mode filter includes a third capacitor coupled between the first positive choke output terminal and the first negative choke output terminal.

Clause 11. The system of any of the clauses, wherein the multi-pole common mode filter includes a third capacitor coupled between the second positive choke output terminal and the second negative choke output terminal.

Clause 12. The system of any of the clauses, wherein the DC-to-DC converter includes a driver powered by an isolated power supply.

Clause 13. The system of any of the clauses, wherein the DC-to-DC converter includes a driver, and comprising a power-factor correction (PFC) controller coupled to the driver via an isolator.

Clause 14. The system of any of the clauses, comprising a second multi-pole common mode filter coupled to between the rectifier and the DC-to-DC converter.

Clause 15. The system of any of the clauses, wherein a power supply of the driver is sourced from a second DC-to-DC converter.

Clause 16. The system of any of the clauses, wherein a current sensing resistor of the second DC-to-DC converter is connected to an analog to digital converter (ADC) via an isolator.

Clause 17. The system of any of the clauses, wherein the isolator comprises one or more of a capacitive, inductive, radiative, optical, acoustic, and mechanical isolator.

Clause 18. A power converter for an heating, ventilation, and air conditioning (HVAC) system, the power converter comprising: a rectifier for converting an alternating current (AC) input power into a direct current (DC) power with a first voltage; a DC-to-DC converter for converting the DC power with the first voltage into a DC power with a second voltage; a multi-pole common mode filter for removing a high frequency component from common mode noise in the DC power with the second voltage to produce a filtered DC power, wherein the multi-pole common mode filter comprises a portion of an electrical circuit including a ground fault circuit interrupter (GFCI) and removal of the high-frequency component by the multi-pole common mode filter produces a leakage current below a trip threshold of the GFCI; and an inverter for converting the filtered DC power into a drive power for an electric motor coupled to a compressor.

Clause 19. A method for a heating, ventilation, and air conditioning (HVAC) system, the method comprising: converting, with a rectifier, an alternating current (AC) input power into a direct current (DC) power with a first voltage; converting, with a DC-to-DC converter, the DC power with the first voltage into a DC power with a second voltage; removing, with a multi-pole common mode filter, a high frequency component from common mode noise in the DC power with the second voltage to produce a filtered DC power, wherein the multi-pole common mode filter comprises a portion of an electrical circuit including a ground fault circuit interrupter (GFCI) and removal of the high-frequency component by the multi-pole common mode filter produces a leakage current below a trip threshold of the GFCI; and converting, with an inverter, the filtered DC power into a drive power for an electric motor coupled to a compressor.

Clause 20. The method of any of the clauses, wherein the trip threshold is 4-6 milliamps.

Clause 21. A device for converting power, comprising: a rectifier for converting an alternating current (AC) input power into a direct current (DC) power with a first voltage; a DC-to-DC converter for converting the DC power with the first voltage into a DC power with a second voltage, wherein the DC-to-DC converter includes a driver; a multi-pole common mode filter for removing a high-frequency component from the DC power with the second voltage to produce a filtered DC power; and an inverter for converting the filtered DC power into an AC drive power.

Clause 22. The device of any of the clauses, wherein the multi-pole common mode filter produces a leakage current below a trip threshold of a ground fault circuit interrupter when the high-frequency component is removed.

Clause 23. The device of any of the clauses, wherein the trip threshold is 4-6 milliamps.

Clause 24. The device of any of the clauses, wherein the multi-pole common mode filter is configured to filter out frequencies above the switching frequency of the inverter.

Clause 25. The device of any of the clauses, wherein the multi-pole common mode filter is configured to filter out a frequency above 1 kilohertz.

Clause 26. The device of any of the clauses, wherein the multi-pole common mode filter is configured to filter out a frequency between 4 and 20 kilohertz.

Clause 27. The device of any of the clauses, wherein the multi-pole common mode filter comprises a common mode choke, a first capacitor, and a second capacitor, the common mode choke comprising a positive output terminal and a negative output terminal, the first capacitor coupled between the positive output terminal and an earth ground, and the second capacitor coupled between the negative output terminal and the earth ground.

Clause 28. The device of any of the clauses, wherein the first and second capacitors are below 25 nanofarads.

Clause 29. The device of any of the clauses, wherein the first and second capacitors are between 0 and 10 nanofarads.

Clause 30. The device of any of the clauses, wherein the first and second capacitors are 4.7 nanofarads.

Clause 31. A method comprising: converting an alternating current (AC) input power to a direct current (DC) power of a first voltage; converting the DC power of the first voltage into a DC power of a second voltage; removing a high-frequency component from the DC power of the second voltage with a multi-pole common mode filter to produce a filtered DC power; and converting the filtered DC power to a drive power for an electric load.

Clause 32. The method of any of the clauses, comprising filtering out frequencies above the switching frequency of the inverter to remove the high-frequency component from the DC power of the second voltage.

Clause 33. The method of any of the clauses, comprising filtering out a frequency above 1 kilohertz to remove the high-frequency component from the DC power of the second voltage.

Clause 34. The method of any of the clauses, comprising filtering out a frequency between 4 and 20 kilohertz to remove the high-frequency component from the DC power of the second voltage.

Clause 35. The method of any of the clauses, wherein the multi-pole common mode filter produces a leakage current below a trip threshold of a ground fault circuit interrupter during removal of the high-frequency component from the DC power of the second voltage.

Clause 36. The method of any of the clauses, wherein the multi-pole common mode filter produces a leakage current below 3.5 milliamps during removal of the high-frequency component from the DC power of the second voltage.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. A heating, ventilation, and air conditioning (HVAC) system comprising:

a compressor;

an electric motor coupled to the compressor;

a rectifier for converting an alternating current (AC) input power into a direct current (DC) power with a first voltage;

a DC-to-DC converter for converting the DC power with the first voltage into a DC power with a second voltage;

a multi-pole common mode filter for removing a high frequency component from common mode noise in the DC power with the second voltage to produce a filtered DC power, wherein the multi-pole common mode filter comprises a portion of an electrical circuit, the electrical circuit including a ground fault circuit interrupter (GFCI), and removal of the high-frequency component by the multi-pole common mode filter produces a leakage current below a trip threshold of the GFCI; and an inverter for converting the filtered DC power into a drive power for the electric motor coupled to the compressor.

2. The system of claim 1, wherein the electric motor comprises a variable speed electric motor.

3. The system of claim 1, wherein the trip threshold is 4-6 milliamps.

4. The system of claim 1, wherein the multi-pole common mode filter comprises a positive input terminal, a negative input terminal, a positive output terminal, and a negative output terminal, and wherein the negative input terminal of the multi-pole common mode filter is connected to an unfiltered DC− ground and the negative output terminal of the multi-pole common mode filter is connected to a filtered DC− ground.

5. The system of claim 4, wherein the multi-pole common mode filter includes a first common mode choke having a first positive choke input terminal, a first negative choke input terminal, a first positive choke output terminal, and a first negative choke output terminal.

6. The system of claim 5, wherein the multi-pole common mode filter includes a first capacitor and a second capacitor, the first capacitor coupled between the first positive choke output terminal and an earth ground, and the second capacitor coupled between the first negative choke output terminal and the earth ground.

7. The system of claim 6, wherein the multi-pole common mode filter includes a second common mode choke having a second positive choke input terminal, a second negative choke input terminal, a second positive choke output terminal, and a second negative choke output terminal.

8. The system of claim 7, wherein the first capacitor is coupled between the second positive choke input terminal and the earth ground, and the second capacitor coupled between the second negative choke input terminal and the earth ground.

9. The system of claim 8, wherein the multi-pole common mode filter includes a third capacitor coupled between the first positive choke input terminal and the first negative choke input terminal.

10. The system of claim 8, wherein the multi-pole common mode filter includes a third capacitor coupled between the first positive choke output terminal and the first negative choke output terminal.

11. The system of claim 8, wherein the multi-pole common mode filter includes a third capacitor coupled between the second positive choke output terminal and the second negative choke output terminal.

12. The system of claim 1, wherein the DC-to-DC converter includes a driver powered by an isolated power supply.

13. The system of claim 1, wherein the DC-to-DC converter includes a driver, and comprising a power-factor correction (PFC) controller coupled to the driver via an isolator.

14. The system of claim 1, comprising a second multi-pole common mode filter coupled to between the rectifier and the DC-to-DC converter.

15. The system of claim 1, wherein a power supply of the driver is sourced from a second DC-to-DC converter.

16. The system of claim 15, wherein a current sensing resistor of the second DC-to-DC converter is connected to an analog to digital converter (ADC) via an isolator.

17. The system of claim 16, wherein the isolator comprises one or more of a capacitive, inductive, radiative, optical, acoustic, and mechanical isolator.

18. A power converter for a heating, ventilation, and air conditioning (HVAC) system, the power converter comprising:

a rectifier for converting an alternating current (AC) input power into a direct current (DC) power with a first voltage;

a DC-to-DC converter for converting the DC power with the first voltage into a DC power with a second voltage;

a multi-pole common mode filter for removing a high frequency component from common mode noise in the DC power with the second voltage to produce a filtered DC power, wherein the multi-pole common mode filter comprises a portion of an electrical circuit, the electrical circuit including a ground fault circuit interrupter (GFCI), and removal of the high-frequency component by the multi-pole common mode filter produces a leakage current below a trip threshold of the GFCI; and an inverter for converting the filtered DC power into a drive power for an electric motor coupled to a compressor.

19. A method for a heating, ventilation, and air conditioning (HVAC) system, the method comprising:

converting, with a rectifier, an alternating current (AC) input power into a direct current (DC) power with a first voltage;

converting, with a DC-to-DC converter, the DC power with the first voltage into a DC power with a second voltage;

removing, with a multi-pole common mode filter, a high frequency component from common mode noise in the DC power with the second voltage to produce a filtered DC power, wherein the multi-pole common mode filter comprises a portion of an electrical circuit, the electrical circuit including a ground fault circuit interrupter (GFCI), and removal of the high-frequency component by the multi-pole common mode filter produces a leakage current below a trip threshold of the GFCI; and converting, with an inverter, the filtered DC power into a drive power for an electric motor coupled to a compressor.

20. The method of claim 19, wherein the trip threshold is 4-6 milliamps.

* * * * *